US010592347B2

(12) United States Patent
Todd et al.

(10) Patent No.: US 10,592,347 B2
(45) Date of Patent: Mar. 17, 2020

(54) SELECTING A STORE FOR DEDUPLICATED DATA

(71) Applicant: Hewlett-Packard Development Company, L.P., Houston, TX (US)

(72) Inventors: Andrew Todd, Bristol (GB); Peter Thomas Camble, Bristol (GB); Wayland Kenneth Jeong, Ft. Collins, CO (US); Kaushik Chandrasekharan, Bristol (GB); Dennis Suehr, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 305 days.

(21) Appl. No.: 14/787,086

(22) PCT Filed: May 16, 2013

(86) PCT No.: PCT/US2013/041379
§ 371 (c)(1),
(2) Date: Oct. 26, 2015

(87) PCT Pub. No.: WO2014/185918
PCT Pub. Date: Nov. 20, 2014

(65) Prior Publication Data
US 2016/0077924 A1    Mar. 17, 2016

(51) Int. Cl.
*G06F 16/174*    (2019.01)
*G06F 11/14*    (2006.01)
*G06F 16/13*    (2019.01)

(52) U.S. Cl.
CPC ...... *G06F 11/1453* (2013.01); *G06F 11/1435* (2013.01); *G06F 11/1448* (2013.01);
(Continued)

(58) Field of Classification Search
CPC .... G06F 3/0608; G06F 3/065; G06F 11/1453; G06F 11/1448; G06F 11/1464;
(Continued)

(56) References Cited

U.S. PATENT DOCUMENTS

| 5,805,919 A | 9/1998 | Anderson |
| 6,526,418 B1 | 2/2003 | Midgley et al. |

(Continued)

FOREIGN PATENT DOCUMENTS

| CN | 1908910 A | 2/2007 |
| CN | 101105763 | 1/2008 |

(Continued)

OTHER PUBLICATIONS

Verma at al., An Efficient Disaster Recovery Point Identification Mechanism, FAST '08: 6th USENIX Conference on File and Storage Technologies, all pages.*

(Continued)

*Primary Examiner* — Jay A Morrison
*Assistant Examiner* — Antonio J Caiado
(74) *Attorney, Agent, or Firm* — Hewlett Packard Enterprise Patent Department

(57) ABSTRACT

A technique includes communicating a plurality of hashes associated with chunks of an object to at least some stores of a plurality of stores on which the object is distributed; and in response to the communication, receiving responses indicating a distribution of the associated chunks. The technique includes selecting one of the stores based at least in part on the responses and communicating deduplicated data associated with the object to the selected store.

14 Claims, 11 Drawing Sheets

(52) U.S. Cl.
CPC ........ *G06F 11/1464* (2013.01); *G06F 16/137* (2019.01); *G06F 16/1752* (2019.01); *G06F 2201/80* (2013.01); *G06F 2201/84* (2013.01)

(58) Field of Classification Search
CPC ........... G06F 11/1435; G06F 11/30159; G06F 17/30159; G06F 17/30575; G06F 17/30097; G06F 17/30289; G06F 17/3007; G06F 17/30578; G06F 17/30312; G06F 17/30902; G06F 16/1752; G06F 16/137; G06F 2201/80; G06F 2201/84
USPC .......................... 707/652, 679, 189, 747, 812
See application file for complete search history.

(56) References Cited

U.S. PATENT DOCUMENTS

| | | | |
|---|---|---|---|
| 7,007,044 B1 | 2/2006 | Rafert et al. | |
| 7,213,158 B2 | 5/2007 | Bantz et al. | |
| 7,299,376 B2 | 11/2007 | Kodi et al. | |
| 7,539,710 B1 | 5/2009 | Haustein et al. | |
| 7,558,012 B2 | 7/2009 | Lee | |
| 7,577,806 B2 | 8/2009 | Rowan et al. | |
| 7,610,348 B2 | 10/2009 | Kisley et al. | |
| 7,747,584 B2 | 6/2010 | Jernigan, IV | |
| 7,761,875 B2 | 7/2010 | Karamanolis et al. | |
| 7,827,136 B1 | 11/2010 | Wang et al. | |
| 7,827,192 B2 | 11/2010 | Batterywala | |
| 7,844,581 B2 | 11/2010 | Dubnicki et al. | |
| 7,925,623 B2 | 4/2011 | Therrien et al. | |
| 7,934,066 B2 | 4/2011 | Mu et al. | |
| 7,987,158 B2 | 7/2011 | Boyd et al. | |
| 7,992,037 B2 | 8/2011 | Dubnicki et al. | |
| 8,060,759 B1 | 11/2011 | Arnan et al. | |
| 8,099,392 B2 | 1/2012 | Paterson et al. | |
| 8,185,498 B2 | 5/2012 | Anglin | |
| 8,190,742 B2* | 5/2012 | Fineberg | G11B 27/002 709/201 |
| 8,250,325 B2 | 8/2012 | Holdman et al. | |
| 8,280,932 B2 | 10/2012 | Horn | |
| 8,299,944 B2 | 10/2012 | Provenzano | |
| 8,311,964 B1 | 11/2012 | Efstathopoulos et al. | |
| 8,315,976 B2 | 11/2012 | Multer et al. | |
| 8,335,771 B1 | 12/2012 | Natanzon et al. | |
| 8,340,039 B2 | 12/2012 | Akirav et al. | |
| 8,402,250 B1 | 3/2013 | Julliard | |
| 8,442,952 B1* | 5/2013 | Armangau | G06F 17/30159 706/14 |
| 8,543,782 B2 | 9/2013 | Fineberg et al. | |
| 8,751,448 B1 | 6/2014 | Douglis et al. | |
| 8,924,663 B2* | 12/2014 | Szczepkowski | G06F 3/0608 711/103 |
| 9,134,914 B1 | 9/2015 | Derbeko et al. | |
| 9,268,806 B1* | 2/2016 | Kesselman | G06F 17/30312 |
| 9,317,218 B1* | 4/2016 | Botelho | G06F 3/0655 |
| 2004/0064693 A1 | 4/2004 | Pabla et al. | |
| 2004/0088331 A1 | 5/2004 | Therrien et al. | |
| 2005/0182780 A1 | 8/2005 | Forman et al. | |
| 2005/0240558 A1 | 10/2005 | Gil et al. | |
| 2005/0283500 A1 | 12/2005 | Eshghi et al. | |
| 2006/0048002 A1 | 3/2006 | Kodi et al. | |
| 2006/0053088 A1 | 3/2006 | Ali et al. | |
| 2006/0112222 A1* | 5/2006 | Barrall | G06F 3/0607 711/114 |
| 2006/0129875 A1 | 6/2006 | Barrall | |
| 2007/0088703 A1 | 4/2007 | Kasiolas et al. | |
| 2007/0250674 A1 | 10/2007 | Fineberg et al. | |
| 2007/0266037 A1* | 11/2007 | Terry | G06F 3/0607 |
| 2008/0052327 A1 | 2/2008 | Buah | |
| 2008/0063109 A1 | 3/2008 | Ikushima et al. | |
| 2008/0077993 A1 | 3/2008 | Zimmer et al. | |
| 2008/0244204 A1 | 10/2008 | Cremelie et al. | |
| 2008/0259822 A1 | 10/2008 | Funk et al. | |
| 2008/0263109 A1 | 10/2008 | Patterson | |
| 2008/0282047 A1 | 11/2008 | Arakawa et al. | |
| 2008/0294696 A1 | 11/2008 | Frandzel | |
| 2008/0307000 A1 | 12/2008 | Paterson et al. | |
| 2009/0019443 A1 | 1/2009 | Jakob | |
| 2009/0063587 A1 | 3/2009 | Jakob | |
| 2009/0083504 A1 | 3/2009 | Belluomini et al. | |
| 2009/0113167 A1 | 4/2009 | Camble et al. | |
| 2009/0132619 A1* | 5/2009 | Arakawa | G06F 3/0605 |
| 2009/0164529 A1 | 6/2009 | McCain | |
| 2009/0171888 A1 | 7/2009 | Anglin | |
| 2009/0193223 A1 | 7/2009 | Saliba et al. | |
| 2009/0210454 A1 | 8/2009 | Sagar et al. | |
| 2009/0271454 A1 | 10/2009 | Anglin et al. | |
| 2010/0082700 A1 | 4/2010 | Parab | |
| 2010/0088296 A1 | 4/2010 | Periyagaram et al. | |
| 2010/0094817 A1 | 4/2010 | Ben-Shaul et al. | |
| 2010/0180075 A1 | 7/2010 | McCloskey et al. | |
| 2010/0223441 A1 | 9/2010 | Lillibridge et al. | |
| 2010/0235332 A1 | 9/2010 | Haustein et al. | |
| 2010/0246709 A1 | 9/2010 | Lillibridge et al. | |
| 2010/0281077 A1* | 11/2010 | Lillibridge | G06F 16/2471 707/812 |
| 2010/0332452 A1 | 12/2010 | Hsu et al. | |
| 2011/0010496 A1 | 1/2011 | Kirstenpfad et al. | |
| 2011/0010498 A1* | 1/2011 | Lay | G06F 11/1453 711/115 |
| 2011/0016095 A1* | 1/2011 | Anglin | G06F 11/1453 707/692 |
| 2011/0022718 A1 | 1/2011 | Evans et al. | |
| 2011/0040763 A1 | 2/2011 | Lillibridge et al. | |
| 2011/0055621 A1 | 3/2011 | Mandagere et al. | |
| 2011/0060759 A1 | 3/2011 | Fienblit et al. | |
| 2011/0099351 A1 | 4/2011 | Condict | |
| 2011/0161291 A1 | 6/2011 | Taleck et al. | |
| 2011/0179250 A1 | 7/2011 | Matsuzawa et al. | |
| 2011/0184967 A1 | 7/2011 | Reiter et al. | |
| 2011/0231362 A1* | 9/2011 | Attarde | G06F 11/3442 707/609 |
| 2011/0238635 A1 | 9/2011 | Leppard | |
| 2011/0246741 A1 | 10/2011 | Raymond et al. | |
| 2011/0270800 A1 | 11/2011 | Chou et al. | |
| 2011/0276781 A1* | 11/2011 | Sengupta | G06F 12/0862 711/216 |
| 2011/0307447 A1* | 12/2011 | Sabaa | H04L 67/2842 707/637 |
| 2011/0307659 A1 | 12/2011 | Hans et al. | |
| 2012/0011394 A1 | 1/2012 | Maki et al. | |
| 2012/0016845 A1 | 1/2012 | Bates | |
| 2012/0017059 A1 | 1/2012 | Gold et al. | |
| 2012/0030176 A1 | 2/2012 | Gelson et al. | |
| 2012/0030477 A1 | 2/2012 | Lu et al. | |
| 2012/0047324 A1 | 2/2012 | Wideman | |
| 2012/0084519 A1 | 4/2012 | Vijayan et al. | |
| 2012/0109894 A1 | 5/2012 | Kishi | |
| 2012/0124011 A1* | 5/2012 | Spackman | G06F 16/1756 707/692 |
| 2012/0124012 A1 | 5/2012 | Provenzano et al. | |
| 2012/0124306 A1 | 5/2012 | Abercrombie et al. | |
| 2012/0131025 A1 | 5/2012 | Cheung et al. | |
| 2012/0143715 A1 | 6/2012 | Eshghi et al. | |
| 2012/0150826 A1* | 6/2012 | Vijayan Retnamma | G06F 17/30312 707/692 |
| 2012/0159098 A1 | 6/2012 | Cheung et al. | |
| 2012/0166403 A1* | 6/2012 | Kim | G06F 17/30156 707/692 |
| 2012/0166448 A1 | 6/2012 | Li et al. | |
| 2012/0191670 A1 | 7/2012 | Kennedy et al. | |
| 2012/0191675 A1 | 7/2012 | Kim et al. | |
| 2012/0226699 A1 | 9/2012 | Lillibridge | |
| 2012/0233417 A1 | 9/2012 | Kalach et al. | |
| 2012/0254126 A1 | 10/2012 | Mitra et al. | |
| 2012/0254257 A1 | 10/2012 | Mitra et al. | |
| 2012/0271798 A1 | 10/2012 | Hirsch | |
| 2012/0311339 A1 | 12/2012 | Irvine | |
| 2013/0018855 A1 | 1/2013 | Eshghi et al. | |
| 2013/0024424 A1 | 1/2013 | Prahlad et al. | |

(56) References Cited

U.S. PATENT DOCUMENTS

| | | | |
|---|---|---|---|
| 2013/0046944 A1 | 2/2013 | Domyo et al. | |
| 2013/0086006 A1 | 4/2013 | Colgrove et al. | |
| 2013/0067080 A1 | 5/2013 | Shah et al. | |
| 2013/0282673 A1* | 10/2013 | Fiske | G06F 3/0641 707/692 |
| 2013/0311434 A1* | 11/2013 | Jones | G06F 17/30156 707/692 |
| 2013/0318051 A1* | 11/2013 | Kumar | G06F 17/30156 707/692 |
| 2013/0339319 A1* | 12/2013 | Woodward | G06F 11/1461 707/692 |
| 2013/0346725 A1* | 12/2013 | Lomet | G06F 12/10 711/206 |
| 2014/0181032 A1* | 6/2014 | Kumarasamy | G06F 17/30371 707/640 |
| 2014/0244604 A1* | 8/2014 | Oltean | H03M 7/3091 707/693 |
| 2014/0281587 A1* | 9/2014 | Ignatchenko | G06F 21/64 713/193 |
| 2014/0344229 A1* | 11/2014 | Lillibridge | G06F 3/0608 707/692 |
| 2014/0358871 A1* | 12/2014 | Cideciyan | G06F 17/30156 707/692 |
| 2015/0066877 A1* | 3/2015 | Lillibridge | G06F 3/0641 707/692 |
| 2015/0088840 A1 | 3/2015 | Eshghi et al. | |
| 2015/0220554 A1* | 8/2015 | Kishi | G06F 3/0641 707/692 |
| 2015/0234710 A1* | 8/2015 | Berrington | G06F 11/1407 707/664 |
| 2016/0077924 A1* | 3/2016 | Todd | G06F 11/1435 707/692 |
| 2016/0085751 A1* | 3/2016 | Camble | G06F 17/3007 707/679 |
| 2016/0110260 A1* | 4/2016 | Chandrasekharan | G06F 11/1469 707/652 |
| 2018/0218005 A1* | 8/2018 | Kuhtz | G06F 17/30159 |

FOREIGN PATENT DOCUMENTS

| | | |
|---|---|---|
| CN | 101379465 A | 3/2009 |
| CN | 101820426 | 9/2010 |
| CN | 101908077 | 12/2010 |
| CN | 102378969 A | 3/2012 |
| CN | 102591947 | 7/2012 |
| EP | 0720085 | 7/1996 |
| GB | 2423218 | 8/2006 |
| GB | 2470497 A | 11/2010 |
| KR | 10-2012-0044550 | 5/2012 |
| WO | WO-0233551 A1 | 4/2002 |
| WO | WO2009/033074 A2 * | 3/2009 ............ G06F 15/16 |
| WO | WO-2011006859 A1 | 1/2011 |
| WO | WO-2011053274 A1 | 5/2011 |
| WO | WO-2011159322 A1 | 12/2011 |
| WO | WO-2012173600 | 12/2012 |
| WO | WO-2013115822 | 8/2013 |
| WO | WO-2013137878 A1 | 9/2013 |
| WO | WO-2014185914 A1 | 11/2014 |
| WO | WO-2014185915 A1 | 11/2014 |
| WO | WO-2014185916 A1 | 11/2014 |
| WO | WO-2014185918 A1 | 11/2014 |

OTHER PUBLICATIONS

Goel at al., The Taser Intrusion Recovery System, University of Toronto, SOSP '05, Oct. 2005, all pages.*

Camargo, R.Y.D. et al., Efficient Maintenance of Distributed Data in Highly Dynamic Opportunistic Grids, (Research Paper), Mar. 8-12, 2009.5 pps., http://www.integrade.org.br/files/camargo-fcf_sac08_v2.pdf.

Coyne, L. et al., IBM System Storage N Series Data Compression and Deduplication Data ONTAP 8.1 Operating in 7-mode, (Research Paper), Jul. 2012, 110 pps., http://www.redbooks.ibm.com/redbooks/pdfs/sg248033.pdf.

Dong, W. et al., Tradeoffs in Scalable Data Routing for Deduplication Clusters, (Research Paper), Proceedings of the 9th USENIX conference on File and stroage technologies, 2011, 15 pps., http://static.usenix.org/event/fast11/tech/full_papers/Dong.pdf.

Harnik, D. et al., Estimation of Deduplication Ratios in Large Data Sets, (Research Paper), Mar. 30, 2012, 11 pps., http://storageconference.org/2012/Papers/17.Deduplication.Estimation.pdf.

International Searching Authority, Appl. No. PCT/US2013/041379, filed May 16, 2013, ISR and Written Opinion, 11pp, dated Feb. 25, 2014.

ISR/WO, PCT/US2013/041350, HP reference 83211159, dated Feb. 24, 2014, 10 pps.

Kaiser, J., et al., (Research Paper), 27 pps., http://storageconference.org/2012/Presentations/R16.Deduplication.DesignOfAnExact.pdf.

Sengar, S.S. et al., A Parallel Architecture for In-line Data Deduplication, (Research Paper), Second International Conference on Advanced Computing & Communication Technologies, Jan. 7-8, 2012, pp. 399-403, http://ieeexplore.ieee.org/xpl/login.jsp?tp=&arnumber=6168400&url=http%3A%2F%2Fieeexplore.ieee.org%2Fxpls%2Fabs_all.jsp%3Farnumber%3D6168400.

Smarter Deduplication with Commvault® Simpana® Software, (Research Paper), 10 pps., http://ecs.arrow.com/suppliers/documents/Smarter-Deduplication.pdf, retrieved Feb. 26, 2013.

Virtual Tape Library/single Instance Repository (VTL/SIR) Cluster Deduplication Gateways, (Research Paper), 2 pps., http://www.falconstor.com/dmdocuments/vtl/VTL_SIR__Cluster__LargeEnterprise.pdf, Retrieved Feb. 27, 2013.

VMware vSphere 5 on NetApp Data ONTAP 8.1 Operating in Cluster-Mode, (Research Paper), Aug. 2012, 165 pps., http://www.globbtv.com/microsite/18/Adjuntos/TR-4068.PDF.

Extended European Search Report received in EP Application No. 13884384.2, dated Mar. 3, 2017, 8 pages.

Extended European Search Report received in EP Application No. 13884582.1, dated Feb. 22, 2017, 8 pages.

EMC Corporation, "EMC Unveils Data Domain Global Deduplication Array," Apr. 12, 2010, <http://www.emc.com/about/news/press/2010/20100412-01.htm>.

Extended European Search Report received in EP Application No. 13884415.4, dated Feb. 20, 2017, 9 pages.

International Search Report and Written Opinion issued in International Patent App. No. PCT/US2013/041360, dated Feb. 25, 2014, 11 pps.

International Search Report and Written Opinion issued in International Patent App. No. PCT/US2013/041369, dated Feb. 20, 2014, 9 pps.

Lillibridge, M. et al., "Sparse Indexing: Large Scale, Inline Deduplication Using Sampling and Locality," (Research Paper), Jan. 1, 2009, pp. 111-123, available at http://static.usenix.org/events/fast09/tech/full_papers/lillibridge/lillibridge.pdf.

European Patent Office, "Invitation Pursuant to Rule 62a(1) EPC," dated Nov. 23, 2016, issued in EP Application No. 13884415.4; 3 pages.

European Patent Office, "Invitation Pursuant to Rule 62a(1) EPC," dated Nov. 23, 2016, issued in EP Application No. 13884582.1; 3 pages.

Aronovich, L. et al., "The Design of a Similarity Based Deduplication System," Proceedings of SYSTOR 2009, ACM, 2009, 14 pages.

Bhagwat, D. et al., "Extreme Binning: Scalable, Parallel Deduplication for Chunk-Based File Backup," (Research Paper), Jul. 6, 2009, IEEE, 10 pages.

Bobbarjung, D. R. et al., "Improving Duplication Elimination in Storage Systems," ACM Transactions on Storage (TOS) 2.4, 2006, pp. 424-448.

Debnath, B. et al., "ChunkStash: Speeding Up Inline Storage Deduplication Using Flash Memory," (Research Paper), Jun. 2010, 15 pages.

EMC2, "EMC Data Domain Global Deduplication Array, A Detailed Review," (Research Paper), White Paper, Jan. 31, 2011, 24 pages.

(56) References Cited

OTHER PUBLICATIONS

Extended European Search Report received in EP Application No. 12867467.8, dated Aug. 5, 2015, 9 pages.
Extended European Search Report received in EP Application No. 12876001.4, dated Nov. 19, 2015, 8 pages.
Extended European Search Report received in EP Application No. 12876047.7, dated Nov. 19, 2015, 8 pages.
Hewlett-Packard Development Company, L.P., "Maximize Storage Efficiency Across the Enterprise," (Brochure), Dec. 2011, 12 pages.
International Preliminary Report on Patentability received in PCT Application No. PCT/US2012/023649, dated Aug. 14, 2014, 5 pages.
International Preliminary Report on Patentability received in PCT Application No. PCT/US2012/035916, dated Nov. 13, 2014, 5 pages.
International Search Report & Written Opinion received in PCT Application No. PCT/US2009/062056, dated Jul. 26, 2010, 9 pages.
International Search Report & Written Opinion received in PCT Application No. PCT/US2012/023649, dated Oct. 23, 2012, 8 pages.
International Search Report & Written Opinion received in PCT Application No. PCT/US2012/035916, dated Jan. 31, 2013, 8 pages.
ISR/WO PCT/US2012/035917, HP reference 82753481, dated Feb. 13, 2013, 9 pps.
Jain, N. et al., "TAPER: Tiered Approach for Eliminating Redundancy in Replica Synchronization," Proceedings of the 4th Conference on USENIX Conference on File and Storage Technologies, vol. 4, 2005, pp. 281-294.
Narang, A. et al., "Real-time Approximate Range Motif Discovery & Data Redundancy Removal Algorithm," (Research Paper), Proceedings of the 14th International Conference on Extending Database Technology, 2011, pp. 485-496.
Sadowski, C. et al., "SimHash: Hash-based Similarity Detection," 2007, 10 pages, retrieved Apr. 10, 2014, http://www.googlecode.com/sun/trunk/paper/SimHashwithBib.pdf.
Thwel et al., "An Efficient Indexing Mechanism for Data Deduplication," 2009 International Conference on the Current Trends in Information Technology (CTIT), Dubai, Dec. 15-16, 2009, pp. 1-5.
U.S. Appl. No. 14/395,492, Non-Final Rejection dated Aug. 31, 2016, pp. 1-7 and attachments.
Wang, G. et al., "Research on a Clustering Data De-duplication Mechanism Based on Bloom Filter," (Research Paper), International Conference on Multimedia Technology (ICMT), Oct. 29, 2010, 5 pages.
Won, Y. et al. "Efficient Index Lookup for De-duplication Backup System," 2008 IEEE International Symposium on Modeling, Analysis and Simulation of Computers and Telecommunication Systems, 2008, 3 pages.
Zhu, B. et al., "Avoiding the Disk Bottleneck in the Data Domain Deduplication File System," (Research Paper), FAST, vol. 8, 2008, pp. 269-282, available at http://citeseerx.ist.psu.edu/viewdoc/download?doi=10.1.1.360.3741&rep=rep1&type=pdf.
EMC, "EMC Data Domain Boost for Symantec NetBackup and NetBackup Storage Unit Group Failover," Jun. 2010, <http://www.emc.com/collateral/software/white-papers/h7334-data-domain-boost-netbackup-wp.pdf> (13 pages).
EMC, "EMC Introduces DD Boost Software for Data Domain Deduplication Storage Systems," May 11, 2010, Press Release, <http://www.emc.com/about/news/press/2010/20100511-01.htm>.
European Patent Office, "Communication pursuant to Article 94(3) EPC," dated Aug. 2, 2017, issued in EP Application No. 13884415.
European Patent Office, "Communication pursuant to Article 94(3) EPC," dated Aug, 2, 2017, issued in EP Application No. 13884582.1.
European Patent Office, Communication Pursuant to Article 94(3) EPC, issued in European Patent App. No. 12871109, dated Apr. 20, 2016, 3 pages.
Extended European Search Report received in EP Application No. 12871109.0, dated Sep. 19, 2015, 4 pages.
Hewlett-Packard Development Company, L.P., "Best Practices for VTL, NAS and Replication Implementations," (Research Paper), Jun. 7, 2012, 131.
International Preliminary Report on Patentability received in PCT Application No. PCT/US2012/029144, dated Sep. 25, 2014, 7 pages.
International Search Report & Written Opinion received in PCT Application No. PCT/US2013/050990, dated Apr. 22, 2014, 10 pages.
International Search Report received in PCT Application No. PCT/US2012/029144, dated Nov. 20, 2012, 11 pages.
ISR/WO PCT/IN2012/000178, HP reference 82962481, dated Dec. 20, 2012, 14 pps.
Lelii, S., "Quantum Put DXi Accent on Dedupe Backup Target," (Research Paper), TechTarget, Jul. 28, 2011, 2 pages, available at http://searchdatabackup.techtarget.com/news/2240038962/Quantum-puts-DXi-Accent-on-dedupe-backup-target.
Ungureanu, C. et al., "HydraFS: A High-Throughput File System for the HYDRAstor Content-Addressable Storage System," (Research Paper), FAST, vol. 10, 2010, 14 pages, available at http://static.usenix.org/event/fast10/tech/full_papers/ungureanu.pdf.
Kaiser, et al., "Design of an Exact Data Deduplication Cluster," 2012, (Slides), 27 pps., <http://storageconference.org/2012/Presentations/R16.Deduplication/DesignOfAnExact.pdf>.
Kaiser, et al. "Design of an exact data deduplication cluster," 2012, (paper), IEEE 28th Symposium on Mass Storage Systems and Technologies (MSST), 2012 , pp. 1-12.
International Preliminary Report on Patentability received for PCT Patent Application No. PCT/US2013/041379, dated Nov. 26, 2015, 8 pages.
International Preliminary Report on Patentability received in PCT Application No. PCT/US2013/041369, dated Nov. 26, 2015, 6 pages.

\* cited by examiner

|  1010 | 1012 | 1014 | |
|---|---|---|---|
| TEAM MEMBER 1 | TEAM MEMBER 2 | TEAM MEMBER 3 | RESULTS 1020 |
| A | A | A | A |
| 1030 B | C | E | |
| PAGE BOUNDARY | | | |
| C | B | X | B C |
| 1032 D | D | Y | D |
| PAGE BOUNDARY | | | |
| E | E | Z | E |
| F | F | F | F X Y Z |

SELECTING A STORE FOR DEDUPLICATED DATA

BACKGROUND

A typical computer network may have a backup and recovery system for purposes of restoring data (data contained in one or multiple files, for example) on the network to a prior state should the data become corrupted, be overwritten, subject to a viral attack, etc. The backup and recovery system typically includes mass storage devices, such as magnetic tape drives and/or hard drives; and the system may include physical and/or virtual removable storage devices.

For example, the backup and recovery system may store backup data on magnetic tapes, and after a transfer of backup data to a given magnetic tape, the tape may be removed from its tape drive and stored in a secure location, such as in a fireproof safe. The backup and recovery system may alternatively be a virtual tape library-based system that emulates and replaces the physical magnetic tape drive system. In this manner, with a virtual tape library-based system, virtual cartridges, instead of magnetic tapes, store the backup data.

DETAILED DESCRIPTION

Figure 1:
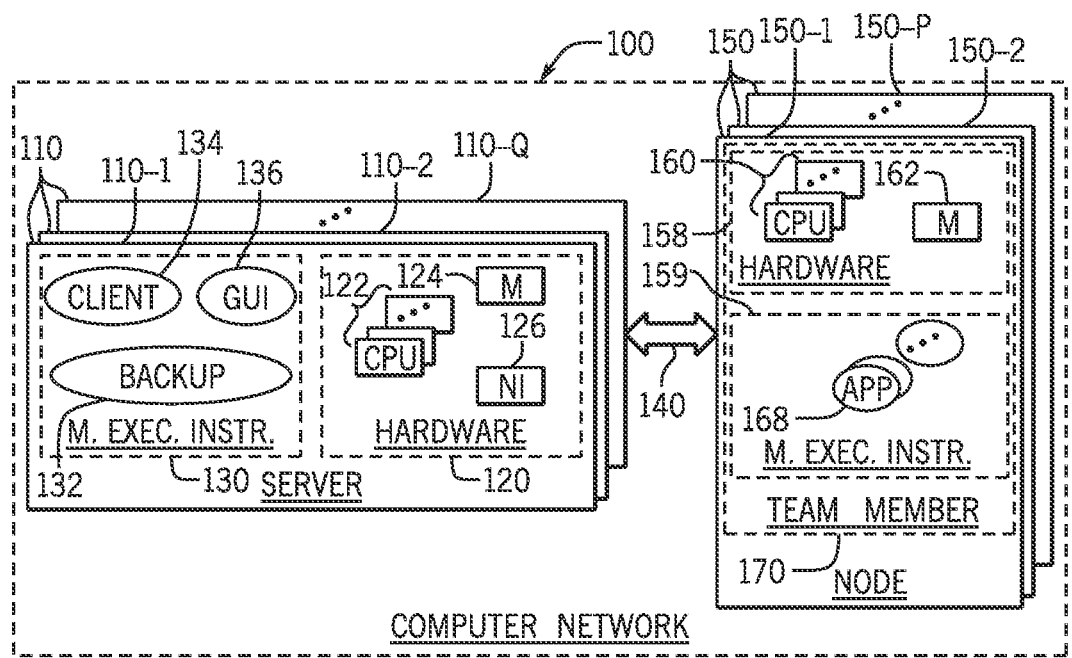
FIG. 1 is a schematic diagram of a computer network according to an example implementation.

Referring to FIG. 1, an example computer network 100 may include a backup and recovery system, which includes backup applications 132 and affiliated client applications 134 that execute on respective servers 110 (servers 110-1, 110-2 . . . 110Q, being depicted in FIG. 1 as examples). In this manner, from time to time, the backup application 132 identifies data to the affiliated client application 134 to be backed up on backup storage devices of the network 100. This data, in turn, is partitioned according to data containers called "objects" herein. From one backup session to the next, given objects that are stored on backup stores are created, deleted and modified. As disclosed herein, among its many functions discussed herein, the client application 134 is constructed to identify changes in the object data: select the stores on which the updated data are stored; and communicate the updated data to the selected stores.

The "stores" may be, as examples, independent computer systems or independent storage subsystems on the same computer system. For the specific example of FIG. 1, the stores are formed on respective nodes 150 (P nodes 150-1, 150-2 . . . 150P, being depicted in FIG. 1 as examples), which are coupled to the servers 110 via a network connection 140 (a local area network (LAN) connection, an Internet-based connection, a wide area network (WAN) connection, a combination of such connections, and so forth, depending on the particular implementation).

As disclosed herein, a given object is stored as a "teamed object" on a cluster, or group, of the stores. Due to the teamed nature, the "stores" are also referred to as "team members 170" herein. In this manner, in accordance with an example implementation, each team member 170 for a given "teamed object" stores "deduplicated data" for the object, where the deduplicated data are data formed from an initial set of data, along with data that represents the changes in the initially stored data. As such, deduplicated data may be retrieved from the team members 170 for a given teamed object to "rehydrate," or reconstruct, the object.

In general, the server 110 is a physical machine that is made of actual hardware 120 and actual machine executable instructions, or "software" 130. In this regard, a given server 110 may include such hardware 120, as one or multiple central processing units (CPUs) 122, a memory 124, a network interface 126, and so forth. In general, the memory 124 is a non-transitory memory, such as magnetic storage, optical storage, storage formed from semiconductor devices, and so forth. The memory 124 may store data locally for the server 110, as well as store instructions that when executed by the CPU(s) 122 cause the CPU(s) to provide one or more components of the machine executable instructions 130.

As illustrated in FIG. 1, the machine executable instructions 130 include the backup application 132 and the client application 134, as well as other possibly other applications that create, modify and delete objects.

A given team member 170 may be formed on a processing node 150 that is also an actual physical machine that is made of actual hardware 158 and actual machine executable instructions 159. The hardware 158 may include, as examples, one or multiple central processing units (CPUs) 160, a network interface and a memory 162. The memory 162 is a non-transitory memory and may be a magnetic storage-based memory, an optical storage-based memory, a semiconductor storage-based memory, and so forth, depending on the particular implementation. The node 150 may include machine executable instructions 159 that include, for example, a team member client application 168.

Thus, a cluster, or group, of team members 170 existing on potentially multiple nodes 150 may form the storage for a given teamed object, in accordance with an example implementation. Moreover, although described herein as existing on separate nodes 150, in accordance with further implementations, a given teamed object may be stored on independent team members, in which two or more the team members are located on the same node 150. Thus, many implementations are contemplated, which are within the scope of the appended claims.

Figure 2:
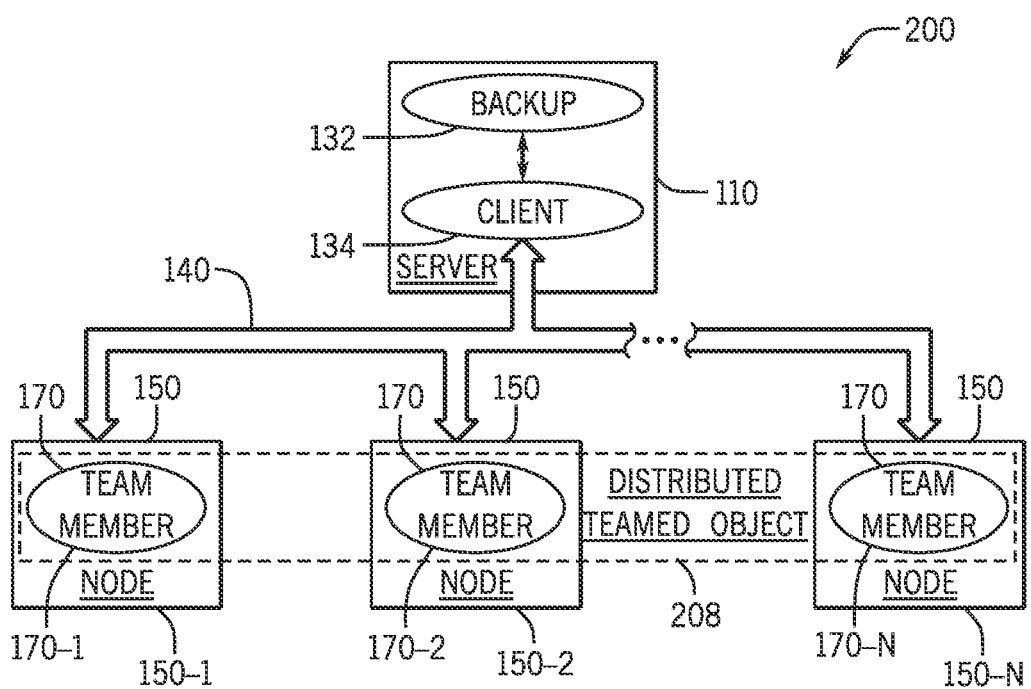
FIG. 2 is an illustration of a data storage system according to an example implementation.

Referring to FIG. 2 in conjunction with FIG. 1, in accordance with an example implementation, a teamed object 208 may be presented as a single logical object to a given client application 134, although data for the object 208 are distributed over a group, or duster, of team members 170. This logical presentation of the teamed object provides applications a single pool of storage, which spans the otherwise independent pools of storage within the duster.

The client application 134, in accordance with some implementations, does not store locally any information regarding the contents of a given teamed object. This allows multiple client applications 134 and therefore, multiple backup applications 132, to access the same teamed object simultaneously and also avoid creating dependencies between specific client applications 134 and the data stored.

As disclosed further herein, to simplify integration with existing backup applications, each team member 170 may be aware of the other team members 170 for a given teamed object and may instruct the client application 134 of their locations. This allows the backup application 132 to connect to any one of the team members 170 and further allows the client application 134 to silently open up connections with all of the team members 170. This may help avoid exposing complex configurations and allow management of teamed objects within the backup applications 132, which may be designed, for example, with single end point topologies.

Because a given teamed object involves multiple independently operating team members 170, in accordance with some implementations, the client application 134 consolidates information from the multiple team members 170 into meaningful information that is communicated to the affiliated backup application 132. In this manner, in accordance with some implementations, a given team member 170 may store individual lists, data job records, copy job records, and so forth, which a given client application 134 may consolidate into meaningful information for the backup application 132. For many of the fields that are returned in the list, the client application 134 provides a summation of all the returned values from across the team member stores, for example, the amount of user data stored. For other fields, the client application 134 may "wrap up" the individual statuses into an overall status, such as the most severe state(s), for example.

When the client application 134 performs a list operation across each of the team members 170, the absolute order of the entries in the list is not guaranteed. For example, two teamed objects may be created virtually simultaneously, and for a given team member 170, object one may be stored first, whereas on another given other team member 170 object two may have been created first. For purposes of providing a single, stable list to the backup application 132, universal identifications are used and list operations are used to search across the storage within a reasonable time window looking for associated records. By having a time-based window over which the search is run, a situation may be avoided in which the entire database is searched on each time member 170 looking for entries, which may under certain circumstances not even exist. As an example, the time window may be a time window in the range of approximately five minutes, but this window may vary, depending on the particular configuration and/or implementation.

As depicted in FIG. 2, although a given distributed teamed object 208 may be distributed among multiple team members 170, a given client application 134 has the logical view of a single corresponding object, which allows each team member 170 to potentially be executing a different release of the application software. This allows users to perform rolling updates to their software without having to be concerned about maintaining consistent software versions across all of the team members 170. In cases in which the capabilities of the software differ among the team members 170, the client application 134 assumes the least capability from across the team members 170.

In accordance with example implementations, for purposes of achieving acceptable deduplication performance across multiple independent team members 170, a bidding technique is used, with a goal of sending similar data to the same team member 170 and load balancing new, unmatched data across the remaining team members 170. In this bidding technique, for a given unit of data (a data segment, for example) the client application 134 requests bids from the team members 170, receives corresponding bid responses from the team members 170, selects one of the team members 170 based on the responses and communicates deduplicated data for the unit of data to the selected team member 170. Moreover, as further described above, the client application 134 may regulate when bidding is and is not used.

Figure 3:
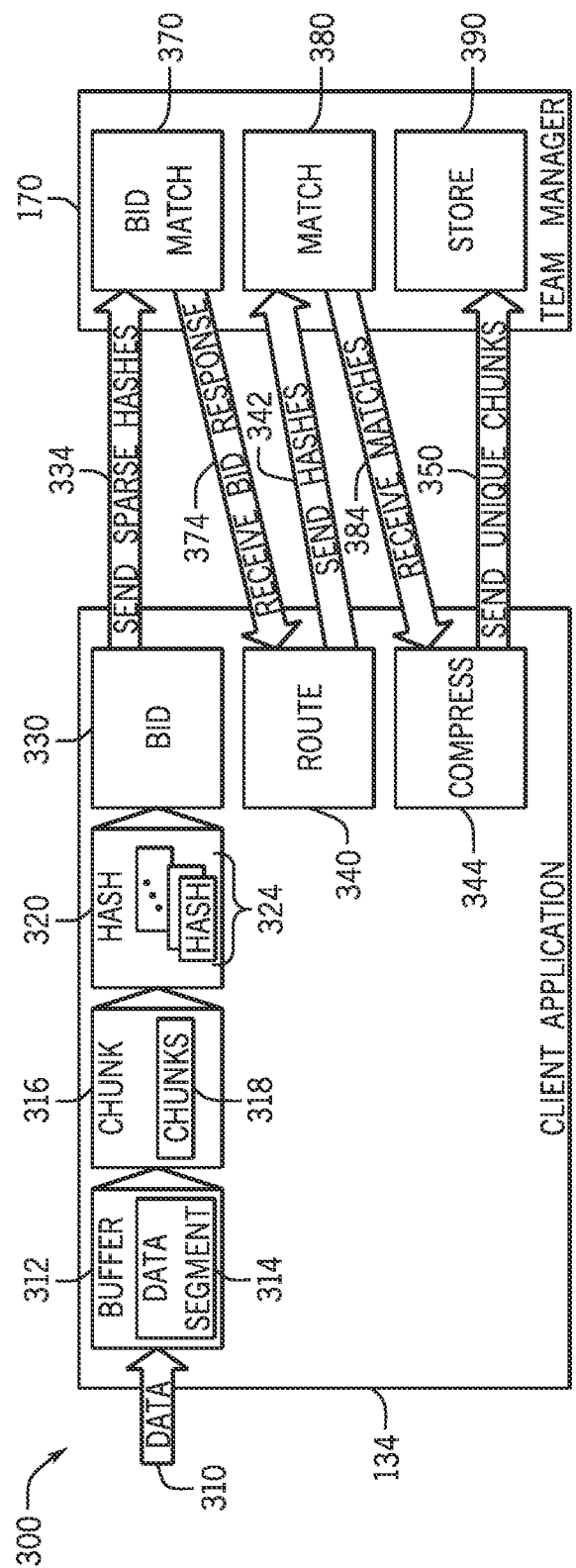
FIGS. 3 and 4 are illustrations of a bidding process used by the data storage system of FIG. 2 to select a team member to receive deduplicated data according to an example implementation.

As a more specific example, referring to FIG. 3 in conjunction with FIG. 1, in accordance with some implementations, the client application 134 processes incoming data 310 to be backed up for purposes of loading balancing the storage of the data according to the illustration 300 of FIG. 3. The client application 134 receives the incoming data 310 in a buffer 312. In this manner, the buffer 312 stores a given data segment 314 or multiple data segments 314, depending on the particular implementation. Regardless of the storage, each data segment 314 is processed in the following manner.

A chunking (or chunk) module 316 of the client application 134 transforms the data segment 314 into corresponding chunks 318. For example, in accordance with some implementations, the chunking module 316 may apply a two thresholds to divisors (TTTD) variable chunking algorithm, which produces an average chunk of approximately four kilobytes (kB). Other chunking algorithms may be used, in accordance with other implementations. In general, the chunking algorithm may enhance the likelihood of isolating identical chunks within successive backups, where the absolute location of the chunk may have moved.

Next, the client application 134 uses a hashing (or hash) module 320 to determine corresponding digital signatures, or hashes 324, for the chunks 318. As an example, in accordance with example implementations, the hashing module 320 may generate an SHA-1 hash for each chunk 318, although other hashes may be used, in accordance with further implementations. In general, a given hash 324 serves as a reasonably certain "fingerprint" for the associated chunk 318; and, on average, the size of the hash 324 may be relatively small, as compared to the size of the chunk 318 (approximately 0.5% of the size of the chunk 318, for example). Therefore, the hash 324 permits a relatively easy, low bandwidth way to identify an associated chunk 318. In accordance with example implementations, the hash module 320 determines hashes 324 for the corresponding chunks 318 and sends or makes available this list of hashes 324 to a bidding (or bid) module 330 of the client application 134.

The bidding module 330, in accordance with example implementations, communicates 334 a sparse index of the hashes to each of the team members 170 for the teamed object. In other words, in accordance with some implementations, the bidding module 330 communicates a statistically representative set of samples of the hashes 324 to the team members 170. FIG. 3 illustrates one such example for team member 170 that receives a sparse index of hashes.

It is noted that in accordance with some implementations, the bidding module 330 may communicate all of the hashes 324 for a given data segment 314 to each team member 170. However, in accordance with an example implementation, a single, relatively large list of hashes for matching may not be practical. In this regard, a twenty byte SHA-1 hash for each average size chunk of 4 kB means 5 gigabytes (GB) of memory for each one terabyte (TB) of unique data. To the contrary, the sparse hash index 334 contains a statistically chosen subset of hashes, such that these hashes adequately represent the chunks 318 while collectively being of a significantly smaller size (between 1 to 10 percent of the size of all of the hashes, for example). When a portion of hashes is communicated to a given team member 170 for matching, the team member 170 determines the number of corresponding hashes that match.

In this manner, in accordance with some implementations, each team member 170 assesses matches and responds to the sparse index as follows. The team member 170 includes a bid matching (or match) module 370 that compares the sparse index against a list of hashes of the data stored in the team member 170. A successful sparse index match may be referred to as a "hook" because the sparse index is held in random access memory (RAM), for example, of the team member 170, and as such, the sparse index lookup may be relatively "cheap," in terms of system resources.

If the bid matching module 370 identifies one or more hooks in the sparse index, the module 370 may then, in accordance with example implementations, perform a more detailed matching, involving reading on-disk manifests pointed to by the sparse index hooks. Because this latter step involves disk seeks, which are relatively slow, this may be a relatively expensive process. To mitigate the use of the disk seeks, in accordance with example implementations, the on-disk manifests are read in some priority order based on the expected number of extra matches that will be found, with some stopping condition applied when there are many hooks, to keep performance up at the expense of a relatively small reduction in deduplication.

By providing the client application 134 a method of querying the sparse hash index, the sparse index hook count may be used to determine the probability of a given team member 170 matching the chunks 318.

In addition to the sparse index hook count, other information about the team member 170, such as the storage capacity and storage utilization (as two examples) may be communicated back to the client application 134 as part of the bid response. This information may then be used by the client application 134 to make a decision about which team member 170 to select for purposes of routing all of the remaining hashes and the subsequent deduplicated data for the segment 314.

Thus, in accordance with some implementations, the bidding involves the bidding module 330 of the client application 134 communicating 334 the sparse index of hashes to the bidding match module 370 of each team member 170. The bidding match module 370 then communicates a bid response 374 to a router (or route) module 340 of the client application 134. As an example, in accordance with example implementations, the router module 340 may receive 374 one or more matches from the bidding match module 370. The router module 340 determines, based on the similar responses from the team members 170, which team member 170 is to receive the deduplicated chunks 318 of data for the segment 314.

After the router module 340 has selected the particular team member 170 (assumed for this example to be the team member 170 of FIG. 3), the router module 340 communicates, or sends 342, all of the remaining hashes for the chunks 318 of the data segment 314 to a matching (or match) module 380 of the team member 170. The matching module 380 compares all of the hashes of the chunks 318 to the corresponding hashes of data stored on the team member 170. The matching module 380 communicates 384 the matches to a compression (or compress) module 344 of the client application 134. In this manner, the matches inform the compression module 344 as to the unique chunks 318, i.e., the chunks 318 that are not stored on the team member 170. In response, the compression module 344 performs deduplication to communicate, or send 350, the unique chunks (e.g., the chunks of changed data) to a storage module 390 of the team member 170, which commits the new chunks to the team member 170.

The purpose of regular bidding is to route similar data chunks to the same team member 170. It is noted that each time a decision is made to change the team member 170, the segments that are routed to the new team members may have a negative impact on the overall deduplication ratio. This is due to the relatively high likelihood that the data segment boundary does not align with the deduplication segment boundaries, and therefore, some duplicated data may be stored again. The fragmentation of the data stream may therefore be something that is controlled in a manner to minimize the reduction of the deduplication ratio, in a process that is further described below.

Figure 4:
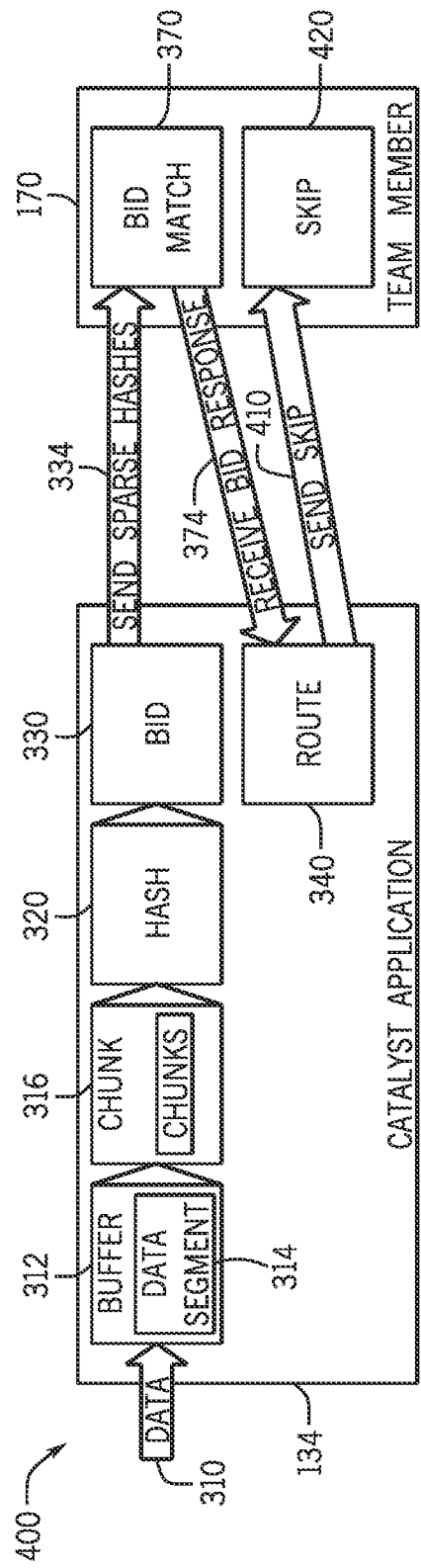

FIG. 4 depicts an illustration 400 of the communications that occur when a given team member 170 is not selected in the bidding process. In this regard, in response to the communication 334 of the sparse hash index, the bid matching module 370 of the team member 170 communicates a bid response 374, which for this example is not a winning bid. Therefore, the router module 340, for this example, sends, or communicates 410, a skip message to a skip module 420 of the team member 170, thereby informing the team member 170 of the bypassing of the member 170 for this particular data segment 314.

Figure 5:
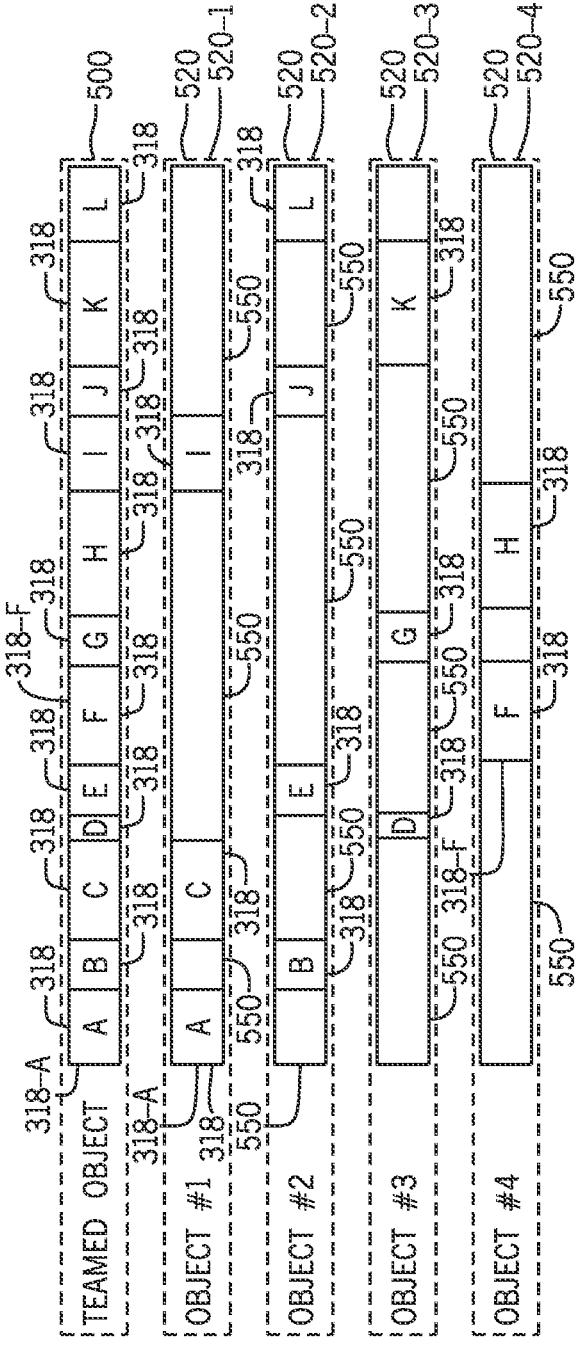
FIG. 5 is an illustration of the storage distribution of a teamed object across multiple team members according to an example implementation.

Referring to FIG. 5, in conjunction with FIG. 1, when the backup application 132 creates a given teamed object 500, the client application 134 causes corresponding objects 520 (objects 520-1, 520-2, 520-3, 520-4, being depicted in FIG. 5 as examples) to be stored on corresponding team members 170. Data items 318 of the teamed object 500 are distributed among the team members 170 to form the corresponding objects 520. For example, in the teamed object 500, a data item 318-A of the teamed object 500 corresponds to data item 318-A of object 520-1, whereas data item 318-F of the teamed object 500 corresponds data item 318-F of the object 520-4. As can be seen from FIG. 5, the data for a given teamed object may be distributed on a given team member 170 in an order different from the order in which the data appears in the teamed object, as the local ordering is left up to the individual team members 170, in accordance with an example implementation. As depicted in FIG. 5, each object 520 may contain data 550 that is not part of the teamed store. Therefore, the team members 170 may track regions, which contain data for a given teamed store and regions for data that are not part of the given teamed store.

Figure 6:
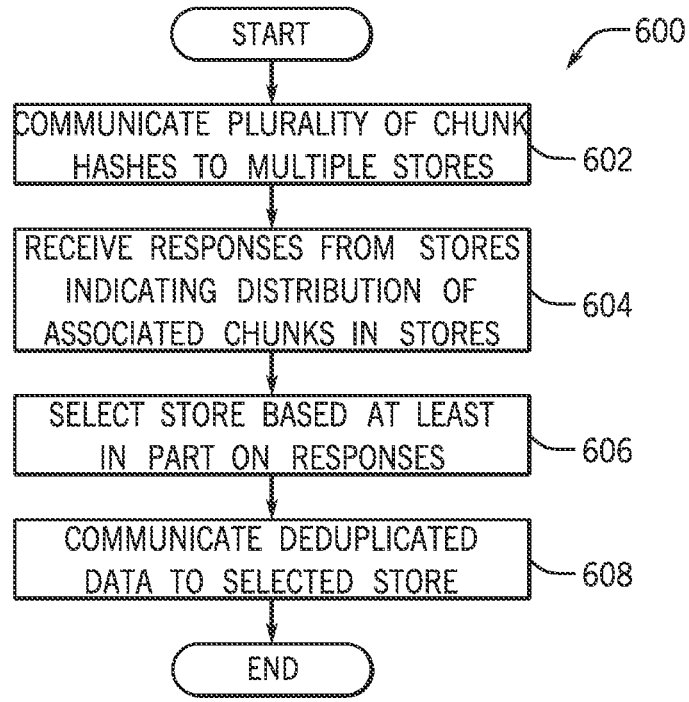
FIG. 6 is a flow diagram depicting a technique to store a teamed object on a cluster of team members according to an example implementation.

Thus, referring to FIG. 6, in accordance with an example implementation, a technique 600 includes communicating (block 602) chunk hashes (a list of chunk hashes, for example) to multiple team members, or stores, and receiving (block 604) responses from the storage, indicating a distribution of associated chunks in the stores. As described above, in example implementations, the list may be a sparse list of hashes. A store is selected (block 606) based at least in part on the responses, and deduplicated data are communicated to the selected store, pursuant to block 608.

In accordance with some implementations, in order for a team member 170 to be considered for a winning bid, the team member 170 first satisfies the criteria of matching a certain number key hashes above a certain threshold. In this manner, such a technique defaults to routing data to a "sticky" team member, i.e., the routing "sticks" to a "sticky team member" until the threshold is surpassed, in accordance with example implementations. By remaining, or sticking, with a team member 170 for several data segments 314 when matches are not above a certain threshold, many time contiguous segments with predominately new data (called "seeding data" herein) are routed to the same team member 170. Seeding large contiguous regions to the same team member 170 may help improve the overall deduplication ratio in a future backup. This is because for a future backup, the backup stream contents may vary to a degree and hence the segments may be aligned differently.

Therefore, if the segments are seeded to a different team member 170 for each data segment 314, segments 314 in a subsequent backup stream may have chunks straddling two team members 170. With a relatively long contiguous sticky region, deduplication may be lost at the ends of the region, not at each segment boundary within the region (as all data in that region was stored on the same team member 170). Thus, a high deduplication ratio may be expected if all the data were routed in a backup to a single team member 170. However, such a technique may not aid in capacity balancing across the team members 170. Therefore, the sticky threshold may be selected to be small enough to be able to "stick to" another team member 170 often enough to seed across all team member 170, but the sticky threshold is large enough to keep the future deduplication ratio relatively high.

Figure 7:
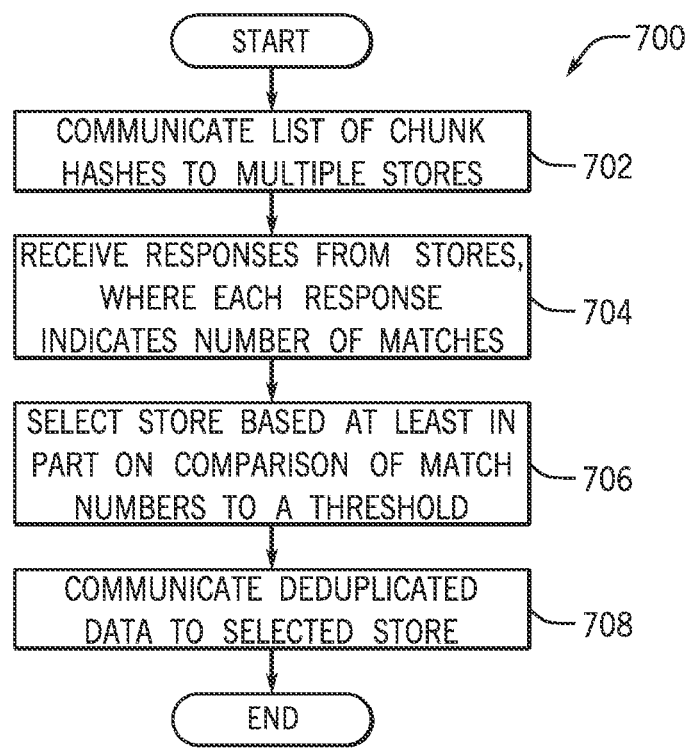
FIGS. 7, 8A and 8B are flow diagrams depicting techniques to select team members for storage of deduplicated data according to example implementations.

Thus, referring to FIG. 7, in general, a technique 700 may be employed, in accordance with example implementations. Pursuant to the technique 700, a list of chunk hashes is communicated (block 702) to multiple team members 170, or stores. Reponses are received (block 704) from the stores, where each response indicates a number of matches. The technique includes selecting (block 706) a store based at least in part on a comparison of a match of the numbers to a threshold, such as the "sticky threshold" mentioned above. The deduplicated data are then communicated (block 708) to the selected store.

The deduplication may be performed between backups from the same system rather than between systems, so that when a system is first backed up, a considerable amount of chunk data may be stored from that system. The first backup is referred to as "seeding" herein and the initial data are referred to as "seeding data" herein. For purposes of avoiding excessive region fragmentation during seeding, a "sticky routing" technique may be used. In general, sticky routing attempts to stripe seeding data across the team members 170 in relatively large contiguous regions (regions on the order of tens of gigabytes (GB), for example), but the technique still routes data segments to other team members 170, if the team members 170 may deduplicate them well enough.

For a given data segment bid, if no team member 170 has a hook match count above a given threshold (called the "bid threshold" herein), then there is no "bid winner." This threshold may be a fixed threshold or may be a threshold that is varied based on feedback obtained during the backup. If there is no bid winner, then the corresponding data segment contains seeding data, so that the data segment is routed to the current seeding team member 170.

In accordance with some implementations, at the beginning of the backup, the client application 134 may select the initial seeding team member 170 using a random or pseudo random technique. This may avoid a situation in which a teamed store is created and all of the first night's backups, starting at the same time, are seeded to the same team member 170. After a fixed amount of data is written, a new seeding team member 170 may be selected based on capacity utilization (the team member 170 having the most free disk space, for example). This technique levels disk usage across the team members 170, as the application 134 stores the seeding data.

Figure 8A:
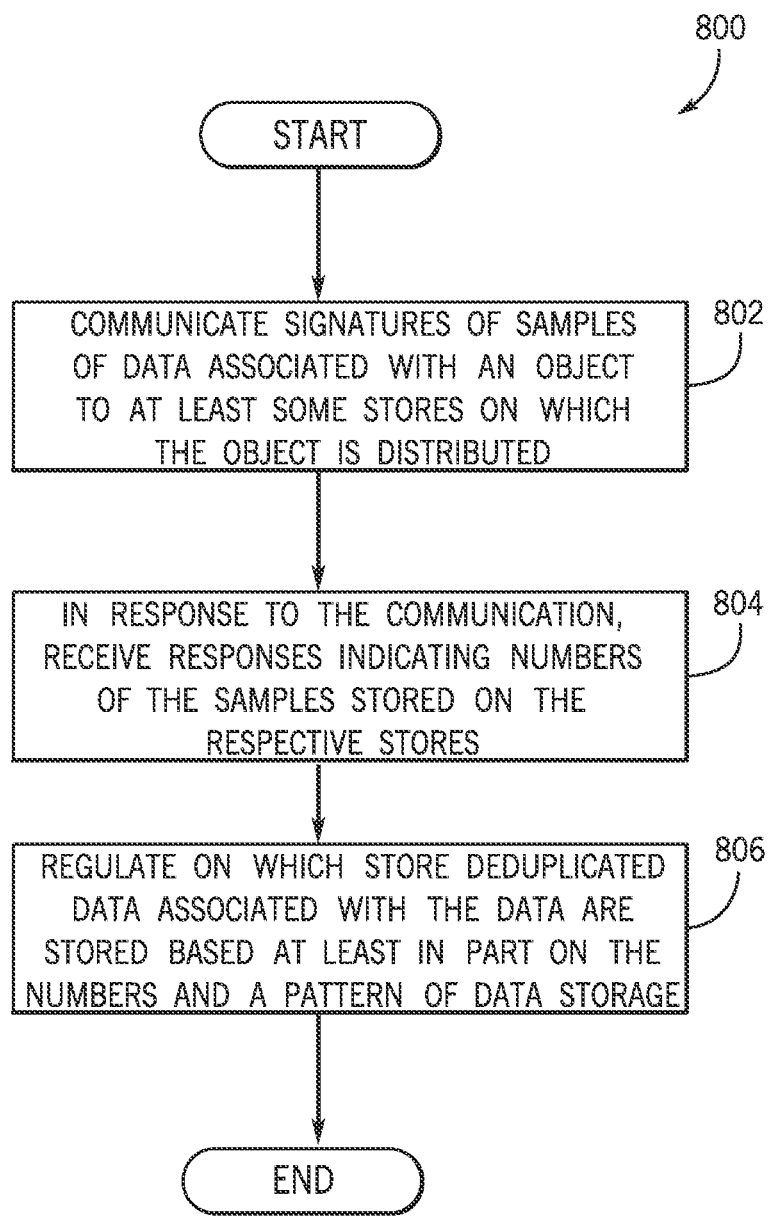

Referring to FIG. 8A, a technique 800 in accordance with an example implementation includes communicating (block 802) signatures of samples of data associated with an object to at least some stores; and in response to the communication, receiving (block 804) responses indicating numbers of the samples stored on the respective stores. The technique 800 further includes regulating (block 806) on which store deduplicated data associated with the first data are stored based at least in part on the numbers and a pattern of data storage on the stores.

Figure 8B:
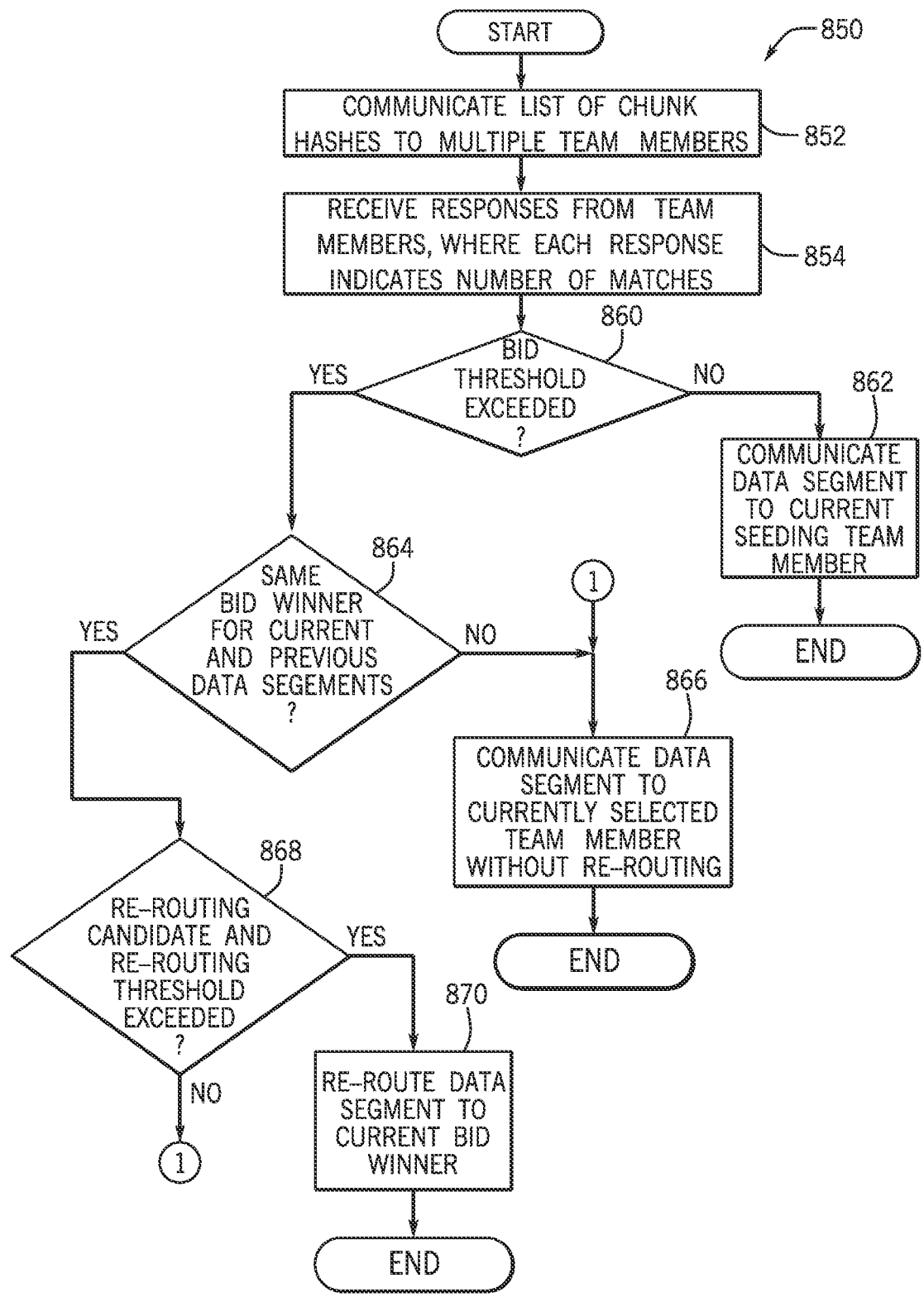

As a more specific example, FIG. 8B depicts a technique 850 in accordance with an example implementation. Pursuant to the technique 850, a list of chunk hashes is communicated (block 852) to multiple team members, or stores; and responses are received (block 854) from the stores, where each response indicates a number of matches. The technique 850 includes determining (decision block 860) whether the bid threshold has been exceeded. If not, then the data segment is seeding data, and the data segment is communicated (block 862) to the current seeding team member 170.

Otherwise, if a determination is made (decision block 860) that the bid threshold has been exceeded, the technique 850 includes determining (decision block 864) whether the current bid winner is the same bid winner as the immediate previous bid winner. If so and if the bid winner is a team member other than the currently selected team member (as determined in decision block 868), then a re-routing occurs and the data segment is routed to the current bid winner, pursuant to block 870. Otherwise, if in decision block 864 a determination is made that the current bid is not the same as the previous bid winner or if a determination is made, pursuant to decision block 868, that re-routing is not to occur, then the data is communicated to the currently selected team member without re-routing, pursuant to block 866.

In accordance with further implementations, the client application 134 may selectively suspend the bidding (and the communication of the hashes) based at least in part on a prediction of future bidding activity. For example, the client application 134 may predict when a region of "flux" exists in which time contiguous data segments 314 would end up being routed to different team members 170 if bids were made for these data segments 314. The client application 134 may temporarily suspend the bidding process when the application 134 predicts a region of flux, in accordance with example implementations.

For example, in accordance with example implementations, a region of flux may be predicted based on the number of measurable factors and/or statistics in a historic window for the current backup session. The factors may include measurements of such criteria as the number of times the bid winner has previously changed, the number of matches seen with the bid losers, the number of matches seen with the bid winner, and the amount of data written to the current bid winner. Using a calculated probability derived from these measurements, the client application 134 may elect not to perform a bid operation for a certain number of time consecutive data segments 314 and instead continue to route data segments 314 to the current winner without performing bidding for these segments 314.

In accordance with example implementations, all access to a teamed object is performed in a command or data session basis using a client-side code library of the application 134. The client library may be given the address of any team member 170 in the teamed store, connect to it and find the addresses of all the other team members 170. The client library may connect to the other team members 170 as well, thereby establishing the command or data session. All team members may not, however, be available for a given session. The team members 170 to which connections were successfully connected in this session may be reported back to the user of the client application library, so that the user may decide whether the user wants to continue with the session.

The client application 134 serves as an aggregator of information that is stored in/retrieved from the team members 170. By allowing sessions to be established with a subset of team members 170, the user of the client application 134 library is presented with a view (via a graphical user interface (GUI) 136 (see FIG. 1), for example) detailing a subset of the information that is available across the team members 170.

For example, when listing a given teamed object, the teamed object may have been created (and partitioned) across team members A, B and C, as those team members may have been, for example, the team members that were available at the time the command session was opened. If a list of that teamed object on a command session open to team members B, C and D is created, then the information available for the object in team members B and C are aggregated and presented to the client library, with the information for team member A not being presented.

When listing the teamed object, the client application 134 reports which team members 170 the team member was created on and last modified on. If the set of team members 170 for which the current command session is opened is not the same as the set on which the object was created and the set on which it was last modified, the client application 134 highlights to the user that an incomplete view of the object is being presented. With this information, the user may decide how to interpret the listing.

Figure 9:
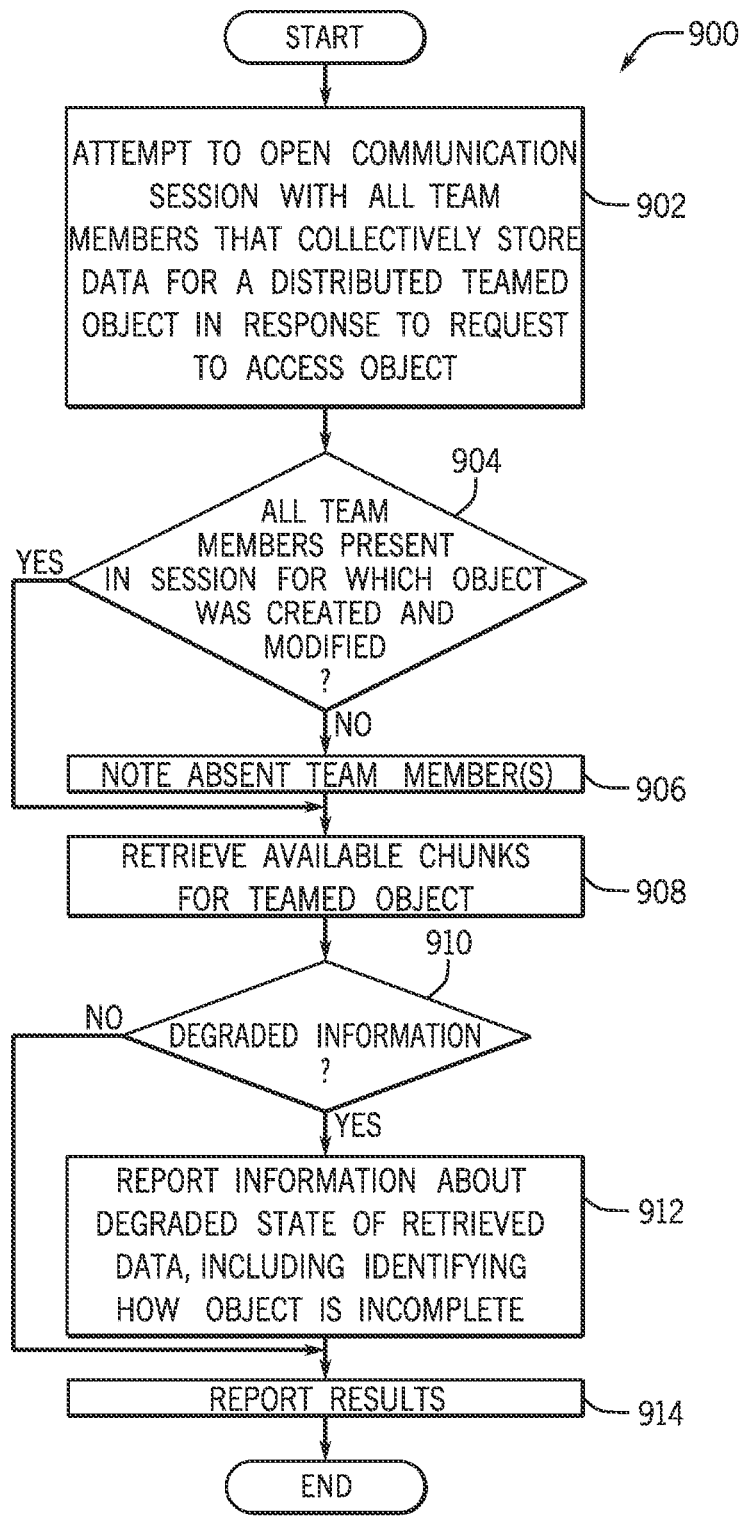
FIG. 9 is a flow diagram depicting a technique to retrieve and report partial teamed object data according to an example implementation.

Thus, referring to FIG. 9, in accordance with an example implementation, a technique 900 includes attempting (block 902) to open communication with all team members 170 that collectively store data for a given distributed teamed object in response to a request to access the object. If a decision is made (decision block 904) that all team members 170 are not present in the session for which the object was created and modified, the technique 900 includes noting (block 906) the absent team member(s). The available chunks for the teamed object are then retrieved, pursuant to block 908. If a determination is made (decision block 910) that degraded information is being reported, then the technique 900 includes reporting (block 912) information about the degraded state of the retrieved data, including identifying how the object is incomplete. With this degraded information, if any, the results are reported, pursuant to block 914.

In accordance with example implementations, the client application 134 also uses this information when aggregating the listing of multiple teamed objects. The challenge relates to how to present a page of listing results to the user by stitching together pages of results from the team members 170, effectively being a windowed multi-way merge. To perform this in an efficient manner, the client application 134 minimizes the number of pages of results retrieved from each team member for each page of results presented to the user.

In particular, the client application 134 uses the following three items of information it receives from each team member 170, in accordance with example implementations: 1.) a team-wide unique identification (ID) for each teamed object (or teamed data job), so that records returned from each team member 170 relate to the same teamed entity (although the identifier does not necessarily have any implied time ordering); 2.) a per team member unique identifier, which is ordered based on the time of creation of the partition of the teamed entity created on that team member (a local team member database row identification, for example); and 3.) a creation timestamp for that partition of the teamed entity created on that team member. It is noted that the clocks on the team members 170 are synchronized, or time-aligned, within a tight enough tolerance to allow the timestamp to be used. For example, in accordance with some implementations, Network Time Protocol (NTP) synchronization of clients may be used.

The non-ordered team-wide unique identification allows the client application 134 to identify records, which match across team members 170, i.e., identify "stitch points." The ordered per team member unique identifier allows the client application 134 to retrieve the next/previous page of results from each team member 170 and therefore, implement a forward/reverse sliding window for each team member 170, which may be used in a multi-wave merge operation. The creation timestamp allows the client application 134 to decide how far the client application needs to search down each team member's results to find the stitch points.

Figures 10, 11:
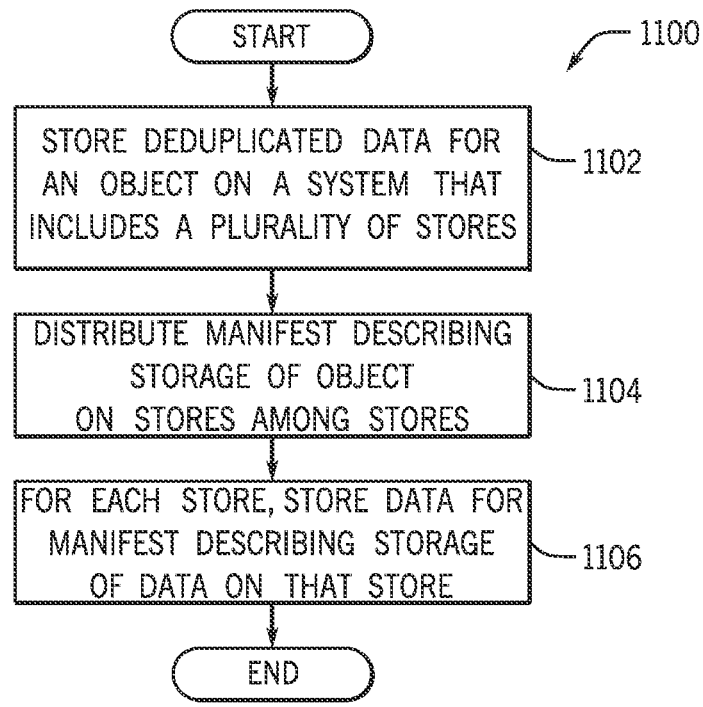
FIG. 10 is a table to illustrate the retrieval of teamed object data from team members according to an example implementation.
FIG. 11 is a flow diagram depicting a technique to distribute a master object manifest among team members according to an example implementation.

As a more specific example, FIG. 10 depicts pages retrieved from team member 1 (via pages depicted in column 1010), team member 2 (via pages depicted in column 1012) and team member 3 (via pages depicted in column 1014). The results from the team members are separated at page boundaries 1030 and 1032. FIG. 10 also depicts a column 1020 of results. For the following example, the client application 134 retrieves a page of up to two team member objects that are timed from each team member 170 and returns a page two teamed objects that are timed to the user in the results column 1020.

More specifically, in order to return the first page of results (A, B), the client application 134 reads one page of results from team member 1, which contains the first two objects (by order of cross-team creation time): A and B; two pages of results from team member 2; and two pages of results from team member 3. The teamed objects B and C, for this example, were actually created at the same time from two different clients; but due to timing differences, teamed objects B and C were created in different order on team member 1 versus team member 2. Because of this, an extra page of results is read from team member 2 for purposes of determining whether a record for teamed object B could be found. The client application 134 knew that there was a record for teamed object B, as the record team member 1 had the information in it as to which team members the teamed object was created on. Moreover, the client application 134 knew that the first page of return results from team member 2 were still around the teamed object was created, so the client application determined that it was realistic to load an extra page to find it.

For the first page of results, the results for team member 3 did not include a record for teamed object B. In order to return the second page of results (C, D), the client application reads one further page of results from team member 1, which contains the next two objects: C and D. Moreover, for this second page of results, no further pages are read from team member 2, if two to three pages are cached for each team member 170, as the information for objects C and D are available in the two pages already cached. From these cached results, the client application 134 knows that it cannot find a record for teamed objects C or D for team member 3.

In order to return the third page of results (E, F), the client application 134 reads one further page of results from team member 1, which contains the next two objects: E and F. The client application further reads one page of results from team member 2, which contains the next two objects: E and F. No further pages of results are retrieved for team member 3, as object E was in the first page (cached). Moreover, the client application 134 knows that it would not find a record for team object F from the creation information in the record for team member 1.

In order to return the third page of results (X, Y), the client application 134 reads the following, no further page results are retrieved from team member 1 (i.e., the end has been reached); no further pages of results are retrieved for team member 2 (i.e., the end has been reached); and one further page of results is retrieved from team member 3, which contains the next two objects: X and Y.

For purposes of returning the fourth page of results (Z), the client application 134 reads the following. No further page of results from team member 1 (i.e., the end has been reached); no further pages of results from team member 2 (i.e., the end is reached); and one further page of results from team member 3, which contains the next object: Z.

In accordance with example implementations, a manifest is created and maintained for each teamed object. In general, the manifest, called an "object manifest," herein, describes the details of the data for a given teamed object stored among the team members. In this manner, the manifest allows the system to track and consolidate the distributed individual data items into one cohesive teamed object. In accordance with example implementations that are disclosed herein, the object manifest is distributed among the team members 170.

More specifically, referring to FIG. 11, in accordance with an example implementation, a technique 1100 includes storing (block 1102) deduplicated data for an object on a plurality of team members 170, or stores, and distributing (block 1104) a manifest, which describes the storage of the teamed object among the stores. In this manner, for each store, the technique 1100 includes storing (block 1106) data for the manifest, which describes the storage of the chunks on that store.

Distributing the object manifest among the team members 170, which is unlike a single master manifest, may help avoid a single point of failure. In other words, with a single manifest, the manifest may become lost or corrupted, which may render the teamed object useless, regardless of the state of the underlying data objects. However, by distributing the object manifest, each team members object manifest (part of the overall distributed object manifest) is entirely self-describing. In other words, each team member 170 has knowledge where its chunks of data fit within the larger teamed object. By storing distributed data in this way, overhead may be reduced, while robustness, redundancy and flexibility may be increased.

Figure 12:
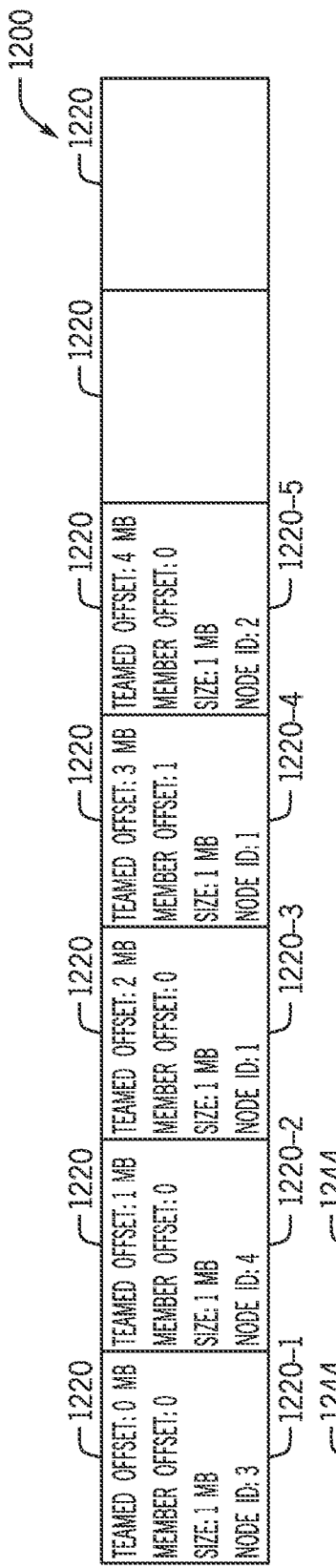
FIG. 12 is an illustration of the distribution of a master object manifest according to an example implementation.
Figure 12:
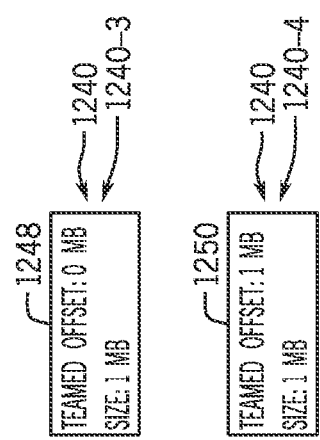

Referring to FIG. 12, in accordance with an example implementation, a master manifest 1200 is created by distributing member manifests 1240 (member manifests 1240-1, 1240-2, 1240-3 and 1240-4, being depicted in FIG. 12 as an example for four respective team members 170), which are stored on individual team members 170. Each member manifest 1240, in turn, includes entries, with each describing the chunks for the associated teamed objects stored on that team member. For example, for team member 1 for the example of FIG. 12, the member manifest 1240-1 contains multiple entries 1244 (entries 1244-1 and 1244-2, being depicted in FIG. 12, as examples), which describe the storage of corresponding chunks. Continuing the example, the team member nodes 2, 3 and 4 store corresponding entries 1246, 1248 and 1250, respectively. Collectively, the entries 1244, 1246, 1248 and 1250 form the entries 1220 of the master manifest 1210.

Thus, as depicted in FIG. 12, the master manifest 1210 includes various entries 1220 (entries 1220-1, 1220-2, 1220-3 and 1220-4, being depicted in FIG. 12 as specific examples), which correspond to the entries that are distributed across the team members.

In general, each entry (where "entry" refers to the entries stored on the team member or collected as part of the member manifest 1240) contains four fields of information: 1.) a first field that specifies where the associated chunk of data resides in the teamed object; 2.) a second field that specifies where the block of data resides in the member object; 3.) a third field indicating the size (in bytes, for example) of the chunk; and 4.) a fourth field that contains data identifying the specific team member on which the associated chunk is stored.

Thus, as depicted in FIG. 12, with the distributed master manifest 1200, each team member 170 contains a member manifest 1240, which only describes the chunks, which the member stores locally.

In contrast to a given entry 1220 of the master manifest 1210, the corresponding member manifest entry contains less information. For example, as compared to the master manifest entry 1220, a member manifest entry does not identify a node as all data stored on the team member has the same node identifier. Instead, a field is added to the team member's object store, describing which team members make up the overall team for the teamed object. This has the added benefit of allowing a team member to be able to contact any of the other team members to find out which team members store data for a given teamed object. Additionally, the member offset in the member manifest entry is not present. In this regard, team members only use teamed offsets, as it is up to the team member regarding how to store their data.

During write operations, each team member 170 records in its member manifest 1240 the data regions that it possesses and where the corresponding chunks reside. When reconstructing the team catalyst chunk for a particular read operation, the corollary to the bidding concept may be used. Another message may be added to the protocol so that the client application 134 may retrieve from each team member about the chunks of data stored for a given teamed object (offset and size, for example).

Thus, the approach disclosed herein federates out the master manifest for a given teamed object among the team members along with the user data, thereby obviating storage of the master manifest at a single location somewhere else.

The federated approach may help use fewer protocol messages for read operations and, in accordance with example implementations, no additional messages for writes, as the manifest is tightly coupled with the data on each team member 170.

Moreover, the loss of an object's master manifest may result in the lo of the entire object, while the loss of an individual member manifest may result in only a partial loss of the object. Moreover, the approach described herein avoids adding redundancy, as redundancy may be relatively complicated. For example, a redundant master manifest would track where each redundant chunk is stored. Also, if the master manifest was stored in more than one place, then each manifest would be synchronized with each other. Considering the case where one of the manifest copies becomes "damaged," significant challenges may exist in determining, with certainty, which of the other copy(ies) is the "good" one. Should a master manifest be completely lost or damaged, there may be no way to reconstruct it. In addition, it may be challenging to add or remove team members from an existing distributed object.

One way to increase the redundancy of the stored data is to store each chunk in more than one team member 170. Using the bidding process, the client application 134 may choose to store the top two bids (as an example) instead of the top one. This would mean that every region may be stored more than once and always on more than one server 110, albeit to the detriment of overall dedupability. Should data be lost on one team member 170, the teamed object may still be reconstructed from the remaining team member objects. The previous level of redundancy for the object may be reinstated by reading back the manifests of the remaining team members, identifying regions, within sufficient redundancy and then writing the amount to a new team member object. Using this approach, redundancy may be achieved with relatively little associated system overhead.

For purposes of migration, an end user may desired to migrate a team member 170 object to a different node with the ultimate goal being to store the object on a different set of disks to free up space on the original node 150. With the distributed member manifest approach, an exact copy of the object on the team member 170 may be migrated from and stored on the new team member 170 that is the target of the migration. The next step is to update the list of team members 170 participating in the storage of that distributed object to remove the old team member 170 and add the new team member 170.

An end user may want to add or remove a particular team member. These operations may be performed using mechanisms similar to the migration described above and by running one or more data write jobs from one or more team members; and furthermore, updating a list of participants among all of the nodes.

If the client application 134 stores user data regions in multiple team member chunks for redundancy, this provides an opportunity for the client application 134 to select which team member 170 from which the user data may be read based on each team member 170 returning server loading information in its response to the "which regions do you own for this extent" message.

Figure 13:
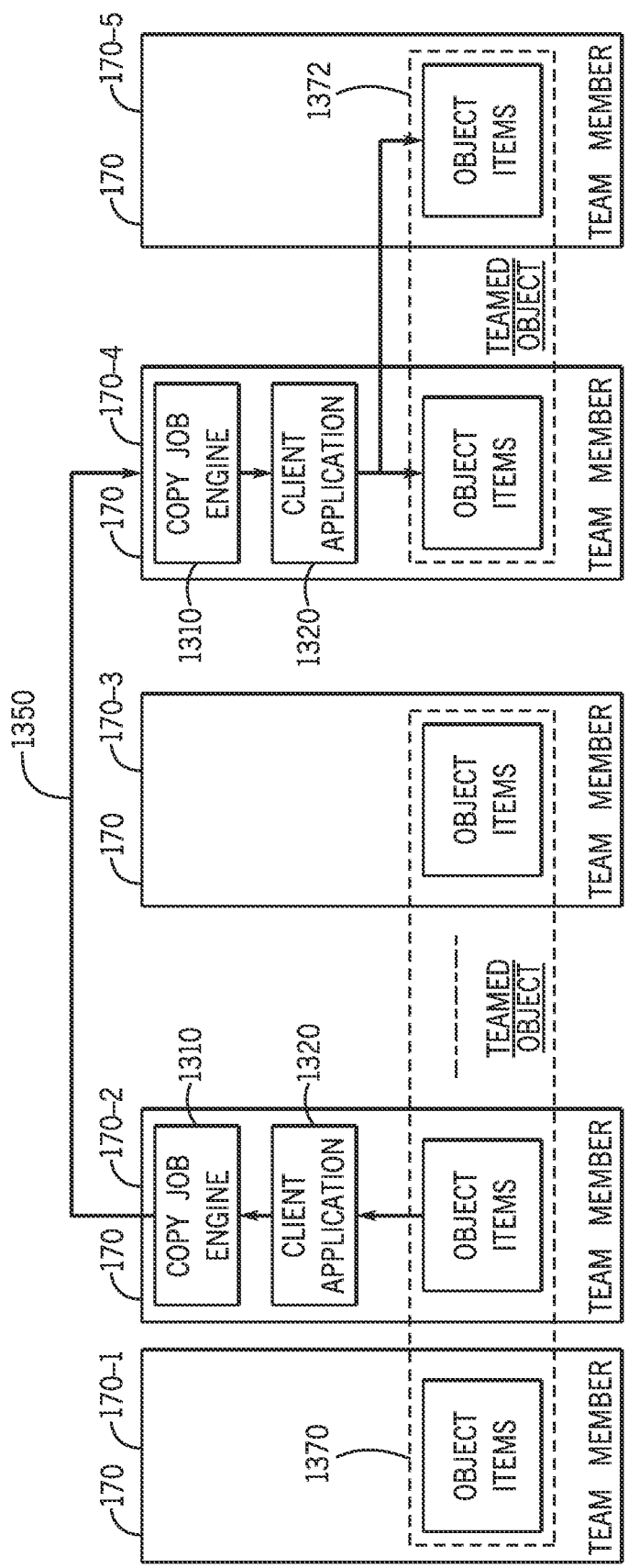
FIG. 13 is an illustration of team member-controlled replication of duplicated data according to an example implementation.

In accordance with example implementations, the backup application 132 may control the replication of data from one team member 170 to another team member 170 over a relatively low bandwidth connection. In this manner, in accordance with example implementations, each team member 170 includes copy job engines 1310 and client applications 1320, as depicted in FIG. 13. The copy job engine 1310 on each team member 170 is constructed to access any chunk in the teamed object via its own instance of the client application 1320. This allows any of the team members 170 to perform copy operations to another team member 170, without the destination teamed store having the same number of team members 170 or any of the same team members as the origin team store, thereby providing replication inoperability across the product portfolio. Therefore, as depicted in FIG. 13, a given copy job engine 1310 on a given team member 170 may use a relatively low bandwidth connection 1350 to replicate a first teamed object 1370 (stored on team members 170-1, 170-2 and 170-3) to form a corresponding different team object 1372, which may have, as illustrated in FIG. 13, be stored on a different grouping of team members 170 (i.e., two team members 170-4 and 170-5, for this example).

For purposes of avoiding rehydration the data during the replication copy, in accordance with some implementations, the client application 134 provides application programming interfaces (APIs) for non-hydrated read and write data paths. In this manner, a non-hydrated read includes reading hashes and unique chunk data with the client application internally dealing with acquiring region information from each team member for purposes of learning where to read the data from. A non-hydrated write operation includes matching hashes and storing unique chunks, with the client application 134 internally dealing the bidding and routing.

Figure 14:
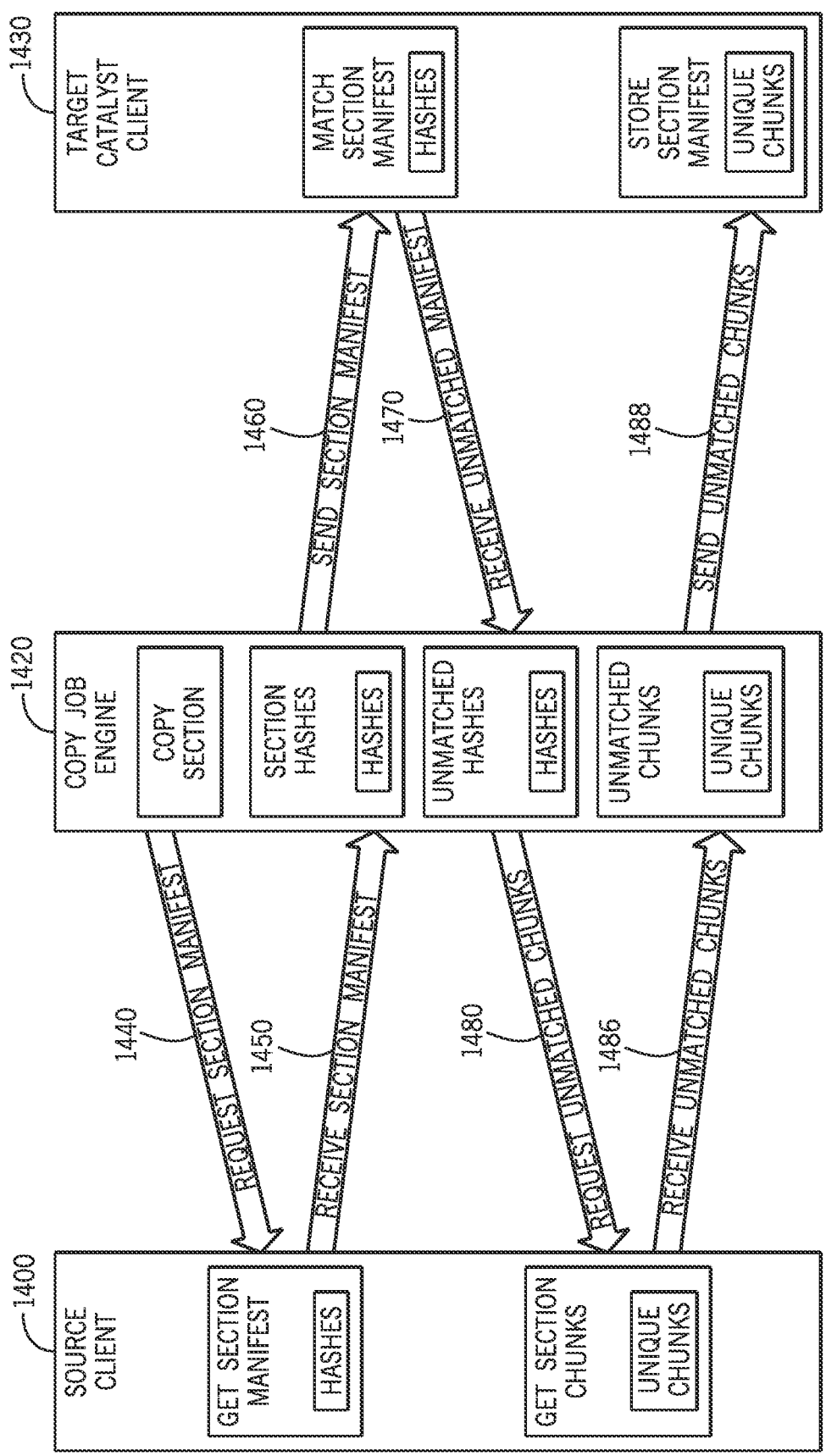
FIG. 14 is an illustration of a non-hydrated replication process according to an example implementation.

FIG. 14 illustrates a non-hydrated copy 1400 involving a source client application 1410, an associated copy job engine 1420 and a target catalyst application 1430. For each section of the copy is ten megabyte (MB) selection, for example), the copy engine 1420 requests 1440 a manifest of hashes from the source client application 1400 and sends 1450 these hashes to a target 1460 to be matched. The target 1460 responds 1470 with a list of unmatched hashes for which chunk data are requested. The copy engine 1420 then requests 1480 these unique chunks from the source client application 1435, receivers 1486 the unmatched chunks and then sends 1488 them to the target 1460 to be stored.

While a limited number of examples have been disclosed herein, numerous modifications and variations therefrom can be appreciated. It is intended that the appended claims cover all such modifications and variations.

What is claimed is:

1. A method comprising:
   communicating, by a processor, a subset of a plurality of hashes associated with chunks of an object to each of a plurality of stores, wherein each of the stores is to match the subset of hashes to a list of hashes of data stored in the store and generate a count value of matched hashes;
   in response to the communication, receiving, by the processor, the count value of matched hashes from each of the stores;
   selecting, by the processor, one of the stores to store deduplicated data associated with the object based on a comparison of the count values of matched hashes received from the stores to a threshold; and
   performing, by the processor, a deduplication process with the selected store using remaining hashes of the plurality of hashes to identify the deduplicated data associated with the object; and
   communicating, by the processor, the deduplicated data associated with the object to the selected store for storage.

2. The method of claim 1, wherein performing the deduplication process with the selected store includes:

sending the remaining hashes of the plurality of hashes to the selected store, wherein the selected store is to match the remaining hashes to the list of hashes of data stored in the selected store and generate hashes that match the hashes stored in the selected store;

receiving the matched hashes from the selected store;

based on the matched hashes, identifying chunks of the object that are not stored in the selected store as the deduplicated data.

3. The method of claim 1, wherein selecting one of the stores includes:

in response to a determination that a plurality of the count values of matched hashes exceeds the threshold, determining whether one of the stores whose count values of matched hashes exceed the threshold is a same as an immediate previous selected store; and in response to a determination that one of the stores is the same as the immediate previous selected store, selecting the immediate previous selected store as a current selected store to store the deduplicated data.

4. The method of claim 1, wherein selecting one of the stores comprises, responsive to a determination that none of the count values of matched hashes received from the stores is above the threshold, selecting a current seeding store of the plurality of stores.

5. The method of claim 1, further comprising:

communicating to each of the non-selected stores an indication that the non-selected store will not be receiving the deduplicated data.

6. A system comprising:

a plurality of team members to store a distributed teamed object; and a client server comprising at least one central processing unit and a memory comprising instructions that, when executed by the at least one central processing unit, are to cause the client server to:

communicate a subset of hashes associated with chunks of the object to each of the plurality of team members, wherein each of the plurality of team members is to match the subset of hashes to a list of hashes of data stored in the team member and generate a count value of matched hashes;

in response to the communication, receive the count value of matched hashes from each team member of the plurality of team members;

select a team member of the plurality of team members to store deduplicated data associated with the object based on a comparison of the count values of matched hashes to a threshold;

perform a deduplication process with the selected team member using remaining hashes of the plurality of hashes to identify the deduplicated data associated with the object; and communicate the deduplicated data associated with the object to the selected team member for storage.

7. The system of claim 6, wherein the subset of hashes is indicative of the chunks of the object.

8. The system of claim 6, wherein to perform the deduplication process with the selected store, the client server is to:

send the remaining hashes of the plurality of hashes to the selected store, wherein the selected store is to match the remaining hashes to the list of hashes of data stored in the selected store and generate hashes that match the hashes stored in the selected store;

receive the matched hashes from the selected store; and based on the matched hashes, identify chunks of the object that are not stored in the selected store as the deduplicated data.

9. The system of claim 6, wherein at least one of the team members is to, in response to not being selected, receive an indication that the team member will not receive the deduplicated data.

10. A non-transitory computer readable storage medium storing instructions that when executed by a computer cause the computer to:

communicate a subset of hashes associated with chunks of an object to each of a plurality of stores, wherein each of the plurality of stores is to match the subset of hashes to a list of hashes of data stored in the store and generate a count value of matched hashes;

in response to the communication, receive the count value of matched hashes from each of the plurality of stores;

select one of the stores to store deduplicated data associated with the object based at least in part on a comparison of the count values of matched hashes to a threshold;

perform a deduplication process with the selected store using remaining hashes of the plurality of hashes to identify the deduplicated data associated with the object; and communicate the deduplicated data associated with the object to the selected store for storage.

11. The non-transitory computer readable medium of claim 10, wherein, to select one of the stores, the instructions are executable to cause the computer to:

in response to a determination that a plurality of the count values of matched hashes exceeds the threshold, determine whether one of the stores whose count values of matched hashes exceed the threshold is a same as an immediate previous selected store; and in response to a determination that one of the stores is the same as the immediate previous selected store, select the immediate previous selected store as a current selected store to store the deduplicated data.

12. The non-transitory computer readable medium of claim 11, wherein, to perform the deduplication process with the selected store, the instructions are executable to cause the computer to:

send the remaining hashes of the plurality of hashes to the selected store, wherein the selected store is to match the remaining hashes to the list of hashes of data stored in the selected store and generate hashes that match the hashes stored in the selected store;

receive the matched hashes from the selected store; and based on the matched hashes, identify chunks of the object that are not stored in the selected store as the deduplicated data.

13. The non-transitory computer readable medium of claim 10, wherein the instructions are executable to cause the computer to, in response to a determination that none of the count values of matched hashes received from the stores is above the threshold, select a current seeding store of the plurality of stores.

14. The non-transitory computer readable medium of claim 10, wherein the instructions are executable to cause the computer to communicate to each of the non-selected stores an indication that the non-selected store will not be receiving the deduplicated data.

* * * * *